United States Patent [19]

Iwamatsu et al.

[11] Patent Number: 4,912,726
[45] Date of Patent: Mar. 27, 1990

[54] DECISION TIMING CONTROL CIRCUIT

[75] Inventors: Takanori Iwamatsu, Otawara; Yoshihito Aono, Nasu; Morihiko Minowa, Machida; Sadao Takenaka, Yokohama, all of Japan

[73] Assignee: Fujitsu Limited, Kawasaki, Japan

[21] Appl. No.: 247,444

[22] PCT Filed: Jan. 8, 1988

[86] PCT No.: PCT/JP88/00013
§ 371 Date: Aug. 31, 1988
§ 102(e) Date: Aug. 31, 1988

[87] PCT Pub. No.: WO88/05235
PCT Pub. Date: Jul. 14, 1988

[30] Foreign Application Priority Data

Jan. 12, 1987 [JP] Japan .................................. 62-004671
Mar. 4, 1987 [JP] Japan .................................. 62-047799
Mar. 4, 1987 [JP] Japan .................................. 62-047800

[51] Int. Cl.$^4$ ............................................. H04L 25/49
[52] U.S. Cl. ........................................ 375/20; 375/120; 328/109; 307/514
[58] Field of Search ............... 375/20, 95, 106, 118, 375/119, 120; 328/108, 109, 114, 118; 329/104; 307/514; 360/44, 51

[56] References Cited

U.S. PATENT DOCUMENTS

| | | | |
|---|---|---|---|
| 3,755,736 | 8/1973 | Kaneko et al. | 375/12 |
| 4,002,982 | 1/1977 | Catania | 375/20 |
| 4,351,061 | 9/1982 | Hedin et al. | 375/20 |
| 4,376,309 | 3/1983 | Fenderson et al. | 375/120 |
| 4,435,825 | 3/1984 | Tomooka | 375/12 |
| 4,635,277 | 1/1987 | Blake et al. | 328/109 |
| 4,661,801 | 4/1987 | Chen et al. | 375/20 |

FOREIGN PATENT DOCUMENTS

| | | |
|---|---|---|
| 50-81004 | 7/1975 | Japan . |
| 50-23926 | 8/1975 | Japan . |
| 54-102855 | 8/1979 | Japan . |
| 57-142051 | 9/1982 | Japan . |
| 57-202164 | 12/1982 | Japan . |
| 59-161149 | 9/1984 | Japan . |
| 60-251742 | 12/1985 | Japan . |

OTHER PUBLICATIONS

International Search Report for PCT/JP88/00013; Japanese Patent Office, 3/28/88.

Primary Examiner—Robert L. Griffin
Assistant Examiner—Stephen Chin
Attorney, Agent, or Firm—Staas & Halsey

[57] ABSTRACT

The present invention relates to a circuit which controls the decision timing for deciding multi-level signal to the optimum decision timing. The control is carried out in such a manner as reducing deviation of phase of decision clock by deciding slope of multi-level signal at the center decision timing from the decision data at least continuous three decision timings and deciding deviation of decision timing from the slope and error signal at the center decision timing. Moreover, two kinds of slope decision are realized and the desired slope decision can be selected in accordance with the line condition.

19 Claims, 7 Drawing Sheets

DECISION TIMING CONTROL CIRCUIT

BACKGROUND OF THE INVENTION

1. Field of the Invention

The present invention relates to a decision timing control circuit provided in the receiving side of the radio data transmission system utilizing the multi-level amplitude modulation method.

2. Description of the Related Art

In the radio data transmission system utilizing the multi-level amplitude modulation, for instance, the 64-level quadrature amplitude modulation (QAM), binary transmission data in the sending side is distributed to 3 bits for I channel and 3 bits for Q channel. The 3 bits of respective channels are subjected to digital-to analog D/A conversion in the timing of a predetermined clock which converts these signals converted to 8-level signals both in the I channel and Q channel. The 8-level signals of I and Q channels are respectively transmitted after the quadrature amplitude modulation.

Figure 1:
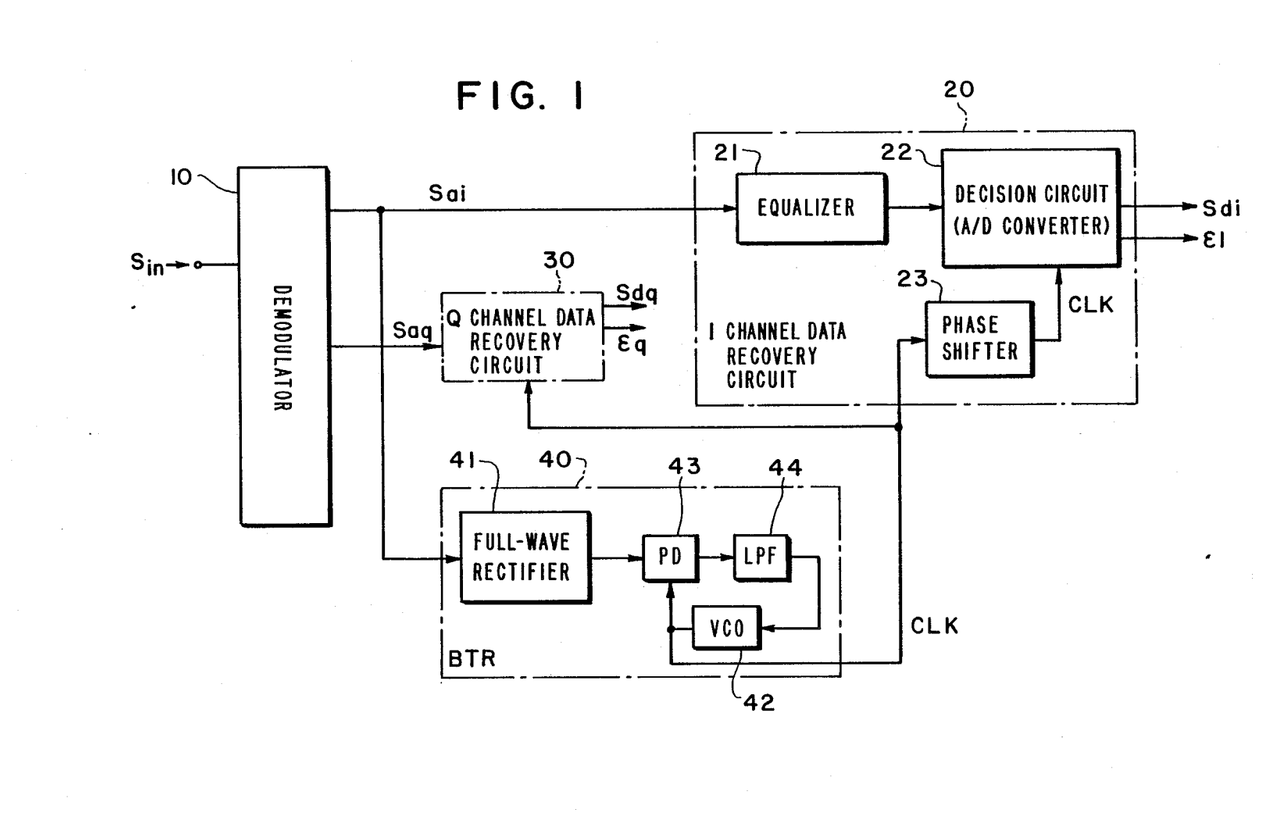
FIG. 1 is a block diagram indicating the structure of the receiving side of the prior art.

A constitution of the receiving side is indicated in FIG. 1. A demodulator 10 inputs a receiving signal $S_{in}$ from a receiver (not illustrated) and outputs the 8-level signals $S_{ai}$, $S_{aq}$ of I and Q channels. The 8-level signals $S_{ai}$, $S_{aq}$ of both I and Q channels are respectively input to data recovery circuits 20, 30 of I and Q channels and the I channel signal is also input to a bit timing recovery circuit (BTR) 40. The bit timing recovery circuit 40 rectifies the 8-level signal $S_{ai}$ of I channel with a full-wave rectifier 41 to generate a clock element. The full-wave rectified signal is then input to a phase comparator 43 together with an output of a voltage controlled oscillator (VCO) 42. A phase difference signal output from the phase comparator 43 is applied as a control voltage to VCO 42 through a low-pass filter 44. Thereby, VCO 42 outputs the clock signal CLK which is synchronized with the 8-level signal $S_{ai}$ of I channel.

Meanwhile, the data recovery circuit 20 of I channel inputs the 8-level signal $S_{ai}$ of I channel to the A/D converter 22 provided as a decision circuit through an equalizer 21. The A/D converter 22 inputs the clock CLK sent from the bit timing recovery circuit 40 through a variable phase shifter 23, decides the 8-level signal $S_{ai}$ of I channel input in the timing of clock CLK and converts it into a binary digital signal, and outputs the 1 bit lower than the upper 3 bits as the decision error signal $\epsilon$ with such upper 3 bits used as the decision data $S_d$. Moreover, the data recovery circuit 30 of Q channel has the structure similar to that of the data recovery circuit 20 of I channel.

For the radio communication system, it is necessary to limit the frequency band of the sending; therefore, a filter is used in the sending side. Accordingly, the 8-level signal demodulated in the receiving side has the gentle waveform in place of the rectangular waveform. As a result, the 8-level signal demodulated has the eye pattern indicated in FIG. 2 which has a eye aperture A that is rather narrow.

Figure 2:
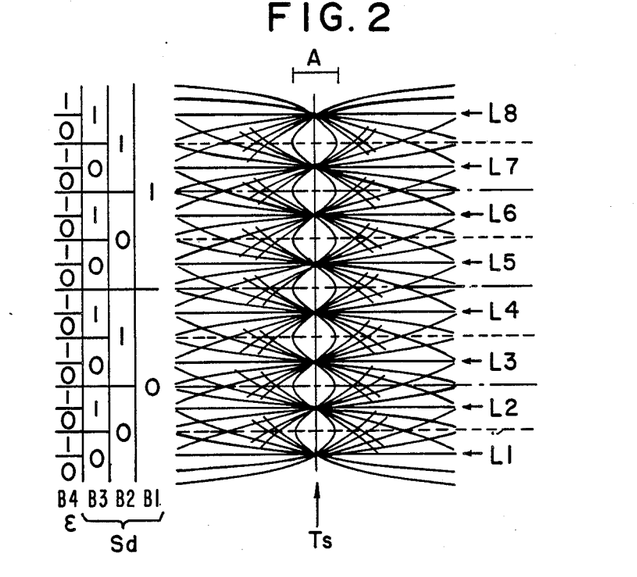
FIG. 2 is a diagram illustrating an eye pattern and decision way.

As the decision timing deviates from the center of such aperture A, the error rate becomes worse. Therefore, the phase of recovered clock is adjusted manually with the variable phase shifter and it is fixed when decisions are carried out at the optimum decision timing $T_s$.

However, here lies a problem in that it is likely that as the clock phase deviates, even after it is once fixed, from the optimum decision timing due to temperature change or voltage variation and it is difficult to quickly match the clock phase and optimum decision timing during the pulling-in period in the initial stage of data transmission or when intersymbol interference due to the fading sometimes appearing increases.

In addition, there is a problem that the demodulated multi-level signal $S_{ai}$ ($S_{aq}$) is disturbed during pulling-in period or when intersymbol interference increases, lacks the number of credible signal points required to control synchronization between clock phase and optimum decision timing. Hence, a longer time is required until the end of control for matching. Furthermore, it is also a problem that the adjustment of equalizer 21 requires a equalizer with a complicated and large scale hardware structure.

In order to solve such problems, a decision timing control circuit indicated in the Japanese patent application No. 141856/1986 has been proposed. However, since this decision timing control circuit monitors information corresponding to an error rate and controls the phase of a clock to reduce such information, the direction of phase shift is not determined directly from the decision digital signal. In fact, the direction of phase shift is determined by "Trial and Error". Therefore, such control is complicated and easily influenced by line conditions.

SUMMARY OF THE INVENTION

It is a first object of the present invention to provide a circuit which automatically controls the decision timing in the receiving side of the radio data transmission system, considering the problems of prior art explained above. It is a second object of the present invention to provide a decision timing control circuit which assures quick and accurate synchronization of timing even under other than normal conditions, for instance, during the pulling-in condition or when intersymbol interference increases. It is a third object of the present invention to provide a decision timing control circuit which directly obtains information about the deviating direction of timing from the decided data. Moreover, it is a fourth object of the present invention to provide a decision timing control circuit which may be formed by a simple circuit structure.

In view of attaining the objects explained above, the present invention controls decision timing by deciding the slope of multi-level signal at the center decision timing $T_0$ from the decision data $S_{d-}$, $S_{d0}$, $S_{d+}$ in at least three continuous decision timings $T_{-1}$, $T_0$, $T_{+1}$ and deciding by deviation of decision timing from such slope and error signal $\epsilon$ of decision timing $T_0$. Thereby, an adequate decision of slope is carried out when the line condition is either normal or deteriorated. Under normal conditions, the slope can be decided from the monotonous increase or decrease, and when the line condition is deteriorated, the slope can be decided depending upon whether a high or a low level of decided data exists before and after the demodulated multi-level signal which is higher than the highest decision level or is lower than the lowest decision level.

DESCRIPTION OF THE PREFERRED EMBODIMENTS

Figure 3:
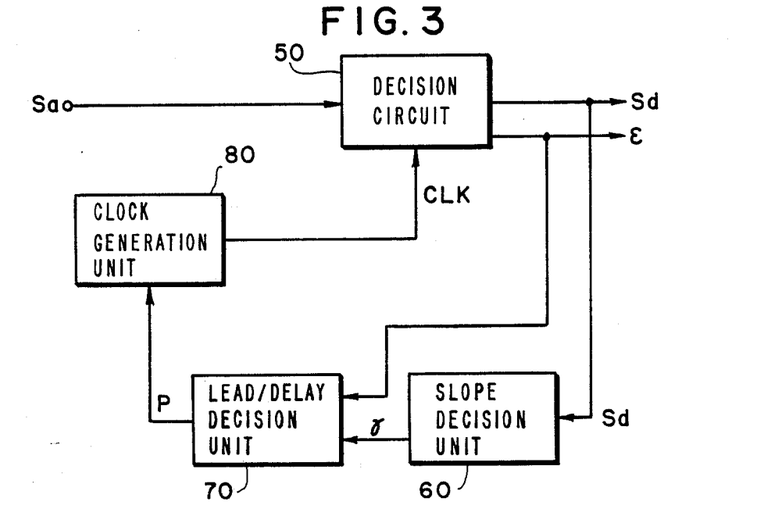
FIG. 3 is a basic block diagram of the present invention.

FIG. 3 indicates the basic constitution of the present invention.

The decision circuit 50 inputs a multi-level signal $S_a$ and outputs decision data $S_d$ and decision error signal $\epsilon$. When a number of a levels of multi-level signal is determined as $2^n$, the decision data $S_d$ becomes a binary digital signal of n bits. The decision error signal indicates whether the input multi-level signal corresponds to the upper or lower range as compared to the corresponding center range of each decided level. For example, in the case of a 8-level signal, three bits B1~ B3 indicate to which level in the 8 levels (L1~L8) the input signal is near, as indicated in FIG. 2, and one bit B4 lower than the decision data is output as the decision error signal $\epsilon$.

Figure 4:
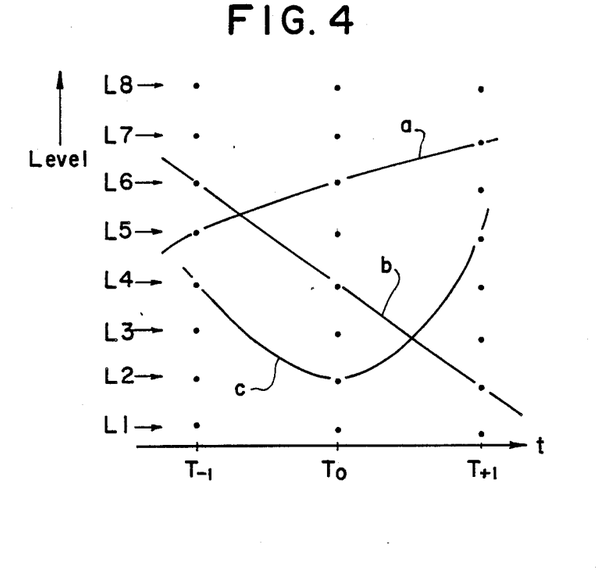
FIG. 4 is a diagram illustrating an example of slope decision in the present invention.

The slope decision unit 60 decides slope of the multi-level signal at the center decision timings from the decision data of at least three continuous decision timings and outputs a slope indication signal ($\gamma$) which indicates whether such slope is positive or negative. For instance, as indicated in FIG. 4, in case the levels indicated by the decision data at the three continuous decision timings $T_{-1}$, $T_0$, $T_{+1}$ increase monotonously like the line (a), the slope at the decision timing $T_0$ is positive. Moreover, the levels decrease monotonously like the line (b), the slope at the decision timing $T_0$ is negative. But, in case the levels are once decreased and thereafter increased, the slope cannot be defined and becomes unclear.

Figure 5:
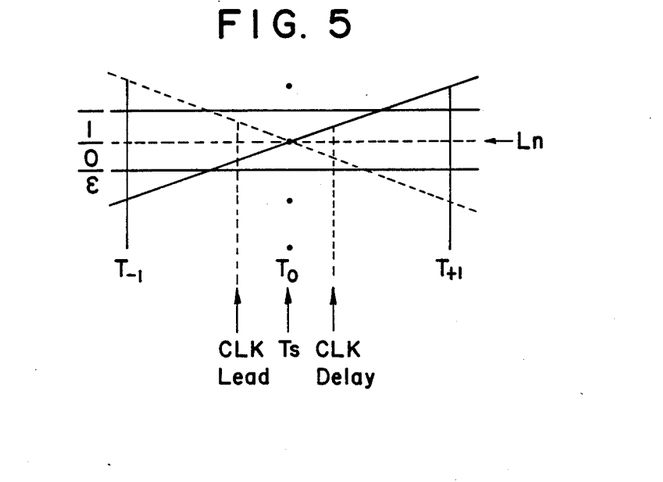
FIG. 5 is a diagram illustrating relationship between slope, deviation of decision timing and decision error signal.

A lead/delay decision unit 70 decides whether the decision timing of decision circuit 50 is leading or delayed from the optimum decision timing $T_s$ from the slope indication signal and decision error signal $\epsilon$ at the center decision timing and outputs a phase decision signal P. For instance, in the case of positive slope indicated by a solid line in FIG. 5, the decision error signal becomes 0 when the decision timing by the decision clock CLK is leading the optimum decision timing $T_s$ or becomes 1 when it is delayed. On the other hand, in case the slope is negative as indicated by a broken line, relationship between the lead and delay of the decision timing and 1, 0 of the decision error signal $\epsilon$ is reversed from that of positive slope. Thereby, lead or delay of the decision timing can be decided from the positive or negative slope and the decision error signal $\epsilon$.

A clock generating unit 80 generates the decision clock for decision timing to send it to the decision circuit 50 and changes the phase of the decision clock based upon the phase decision signal P sent from the lead/delay decision unit 70.

Figure 6:
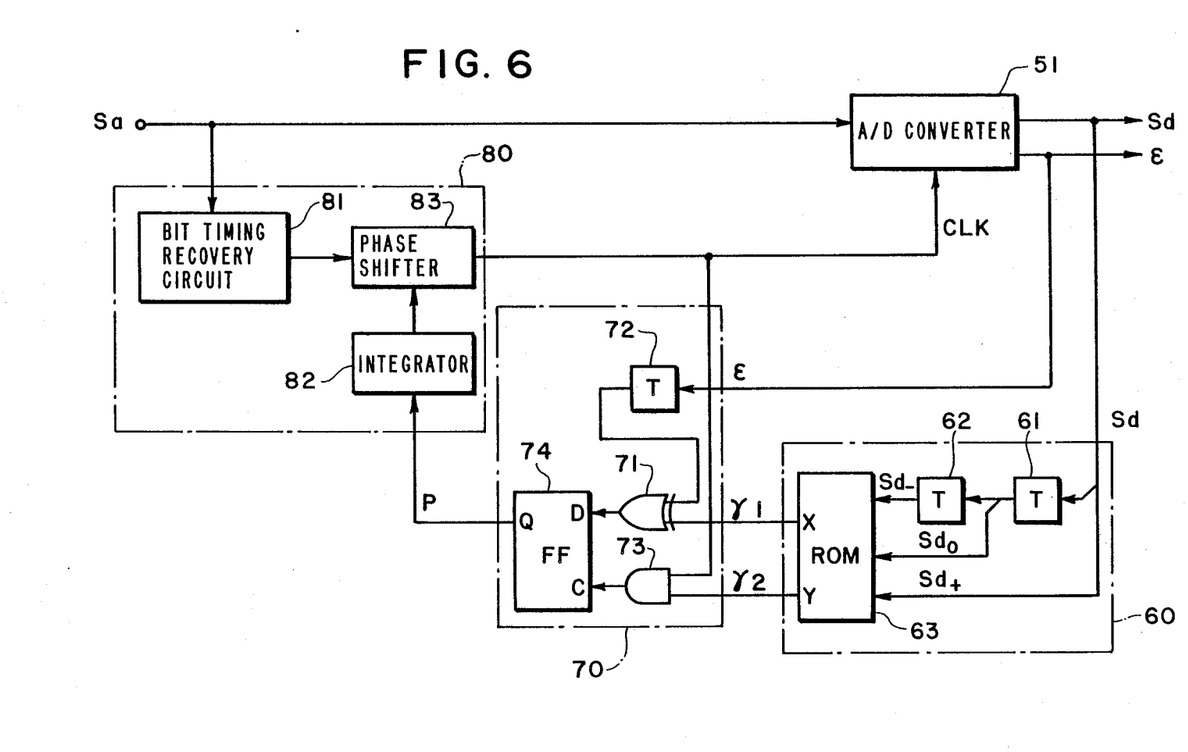
FIG. 6 is a block diagram of a first embodiment of the present invention.

A structure of the first embodiment of the present invention is indicated in FIG. 6.

The A/D converter 51 corresponds to the decision circuit 50 of FIG. 3 and inputs the 8-level signal $S_a$ and outputs the decision data $S_d$ and decision error signal $\epsilon$ indicated in FIG. 2. The delay circuits 61, 62 and read-only memory (ROM) 63 correspond to the slope decision unit 60 of FIG. 3 and the decision data $S_d$ is sequentially input to the cascaded delay circuits (T) 61 and 62.

A D type flip-flop may, for example, be used as a delay circuit. When the decision data output from the delay circuit 61 is the decision data $S_{d0}$ at the center decision timing, the decision data $S_{d-}$ which has appeared one clock cycle earlier is output from the delay circuit 62 and the decision data $S_{d+}$ which appears one clock cycle later is input to the delay circuit 61. These three decision data $S_{d-}$, $S_{d0}$, $S_{d+}$ are input to ROM 63 as an address. In the case of a 8-level signal, the address of ROM 63 becomes 9 bits since the decision data is formed by 3 bits. The contents of X and Y of ROM 63 are respectively the slope polarity signal $\gamma_1$ and the validity signal $\gamma_2$, both being one bit. The slope polarity signal $\gamma_1$ and validity signal $\gamma_2$ correspond to the slope indication signal $\gamma$. The slope polarity signal $\gamma_1$ becomes "1" for positive slope or "0" for negative slope. The validity display signal $\gamma_2$ becomes "1" when the slope polarity signal $\gamma_1$ is valid or "0" when it is invalid. For example, in the case of curve (a) of FIG. 4, $S_{d-}$ becomes "100", $S_{d0}$ becomes "101" and $S_{d+}$ becomes "110" and the slope is positive. Therefore, contents X, Y of address "100101110" of ROM 63 respectively become "1", "1". Similarly contents X, Y of address "101011001" for the line (b) become "0", "1" and contents X, Y of address "011001100" for the line (c) become "0" or "1" and "0". When Y="0", content of X may be "0" or "1" since it does not influence the succeeding circuits. For the other addresses, X="1", Y="1" can be obtained for monotonous increase, while X="0", Y="1" for monotonous decrease and X="0" or "1", Y="0" for the slopes other than monotonous increase and monotonous decrease.

An exclusive OR circuit 71, delay circuit (T) 72, AND circuit 73 and D type flip-flop (FF) 74 correspond to the lead/delay decision unit 70 of FIG. 3. The slope polarity signal $\gamma_1$ sent from ROM 63 is input to the one input terminal of the exclusive OR circuit 71, while the decision error signal $\gamma$ is input to the other input terminal through the delay circuit 72. The delay circuit 72 is provided to synchronize the decision error signal $\epsilon$ to the timing of inputting the decision data $S_{d0}$ at the center decision timing to ROM 63. An output of the exclusive OR circuit 71 becomes "0" which indicates that the decision timing is delayed when the slope polarity signal $\gamma_1$ is "0" and decision error signal $\epsilon$ is "0" and when the slope polarity signal $\gamma_1$ is "1" and decision error signal $\epsilon$ is "1" and becomes "1" which indicates that the decision timing is leading in other cases. Meanwhile, the validity signal $\gamma_2$ is converted to the RZ (Return to Zero) signal by the AND circuit 73 and is then input to the clock terminal C of D type flip-flop 74. Thereby, an output of the exclusive OR circuit 71 is newly held in the D type flip-flop 74 when the validity signal is "1". If the validity signal $\gamma_2$ is "0", the old value is still held. The value held in the D type flip-flop 74 is output as the phase decision signal P.

A bit timing recovery circuit 81 (also referred to as a clock recovery circuit), integrator 82 and phase shifter 83 correspond to a clock generating unit 80. The clock recovery circuit 81 is similar to the bit timing recovery circuit (BTR) 40 indicated in FIG. 1 and recovers the clock from the 8-level signal $S_a$ to output it. The integrator 82 integrates the phase decision signal P. The phase shifter 83 shifts the phase of the recovered clocks depending on the value of the integrated phase decision signal P and outputs it to the A/D converter 51 as the decision clock CLK. Thereby, the decision clock CLK is controlled such that the decision is always carried out in the optimum decision timing.

During realization of the slope decision indicated in FIG. 4, if line conditions are bad and decision at the center decision timing $T_0$ is conducted at the next level, the decision error signal has reverse polarity and the decision timing control generated may be erroneous.

Figure 7:
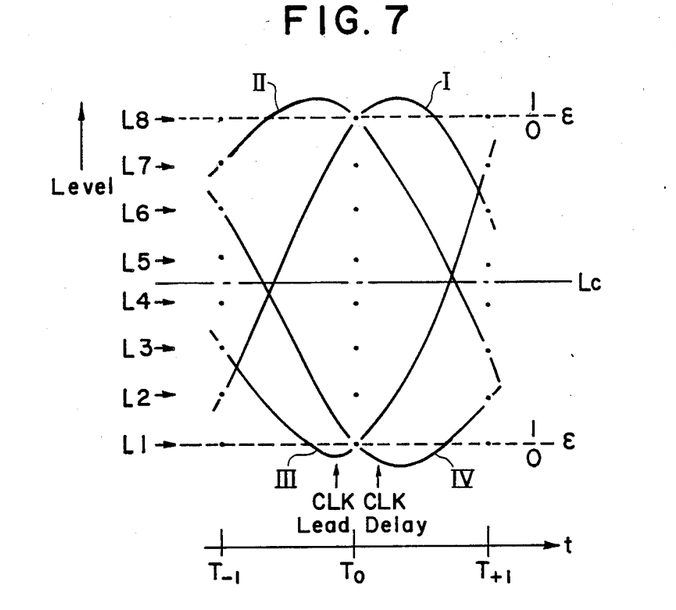
FIG. 7 is a diagram illustrating another example of slope decision in the present invention.

FIG. 7 indicates an example of slope decision which is suitable even if line conditions are bad. When the 8-level signal changes as line I indicates, namely, when the level of decision data at the decision timing $T_{-1}$ is lower than the center level $L_c$, the level of decision data at the decision timing $T_0$ is at the maximum level L8 and the level of decision data at the decision timing $T_{+1}$ is higher than the center level $L_c$, it is impossible that the signal to be decided in a level higher than that at the decision level $T_0$ is decided in a level lower than the actual level. Therefore, when the decision error signal $\epsilon$ is "1", such information has high reliability; furthermore, it is also reliable that the slope is positive.

As explained above, when the level of decision data at the decision timing $T_0$ is maximum level and the decision error signal $\epsilon$ is "1" and when the level of decision data at the decision timing $T_0$ is minimum level and the decision error signal $\epsilon$ is "0", the decision error signal $\epsilon$ has high reliability. When the level of decision data at the decision timing $T_{-1}$ and the level of decision data at the decision timing $T_{+1}$ are opposed to each other around the center level $L_c$, it is very much reliable to make the decision for positive or negative slope at the decision timing $T_0$. Namely, the decision error signal $\epsilon$ has very high reliability when the decision error signal $\epsilon$ is "1" in the waveform such as indicated by line I or II in FIG. 7 and when the decision error signal $\epsilon$ is "0" the waveform in such as indicated by line III or IV. Moreover, the waveform indicated by line I or III has high reliability of positive slope, while the waveform indicated by line II or IV has high reliability of negative slope.

Figure 8:
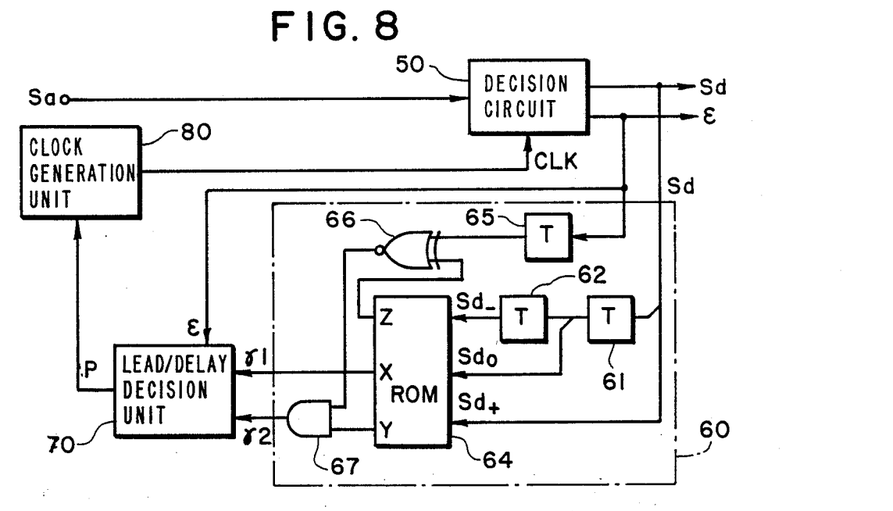
FIG. 8 is a block diagram of a second embodiment of the present invention.

FIG. 8 indicates a constitution of the second embodiment of the present invention.

As a decision circuit 50, lead/delay decision unit 70 and the clock generating unit 80, the circuits indicated in FIG. 6 may be used. The delay means 61, 62, 65, ROM 64, inverse exclusive "AND" circuit 66 and OR circuit 67 correspond to the slope decision unit 60 of FIG. 3 and conduct the slope decisions indicated in FIG. 7. Operations of delay circuits 61 and 62 are same as those of FIG. 6. As the contents X of ROM 64 the slope polarity signal $\gamma_1$ is written, namely the data "1" is written in the addresses corresponding to the type of lines II and III and the data "0" in the addresses corresponding to the type of lines II and IV. In the contents Y of ROM 64, the data "1" is written in the addresses corresponding to the type of lines I, II, III and IV and the data "0" in the other addresses. The contents Z of ROM 64 indicates that the decision data at the decision timing $T_0$ corresponds to the maximum level or minimum level, and the data "1" is written in the addresses corresponding to the type of lines I and II, while the data "0" in the addresses corresponding to the type of lines III and IV. The Z output of ROM 64 and the decision error signal $\epsilon$ at the decision timing $T_0$ sent through the delay circuit 65 are input the inverse exclusive OR circuit 66. The exclusive NOR circuit 66 outputs "1" when the Z output of ROM 64 is "1" and the decision error signal $\epsilon$ is "1", and when the Z output of ROM 64 is "0" and the decision error signal $\epsilon$ is "0" and also outputs "0" in all other cases. Both outputs of exclusive NOR circuit 66 and Y output of ROM 64 are input to the AND circuit 67. Thereby, an output of the AND circuit 67 becomes "1" for the type of lines indicated by I and II with a decision error signal $\epsilon$ of "1" and for the type of lines indicated by III and IV with a decision error signal $\epsilon$ of "0", and the output becomes "0" for all other cases. Accordingly, an output of the AND circuit 67 may be used as the validity signal $\gamma_2$. Moreover, the X output of ROM 64 may be used as the slope polarity signal $\gamma_1$.

In the clock recovery circuit 81 of the embodiment indicated in FIG. 6, VCO 42 controls the oscillation frequency (phase) based on the phase difference signal sent from a phase comparator 43 as indicated in FIG. 1. An output of VCO 42 is further phase-controlled by the phase shifter 83 of FIG. 6. Therefore, the phase control is carried out at two different points for the decision clock CLK. As a result, this circuit structure is not as effective.

Figure 9:
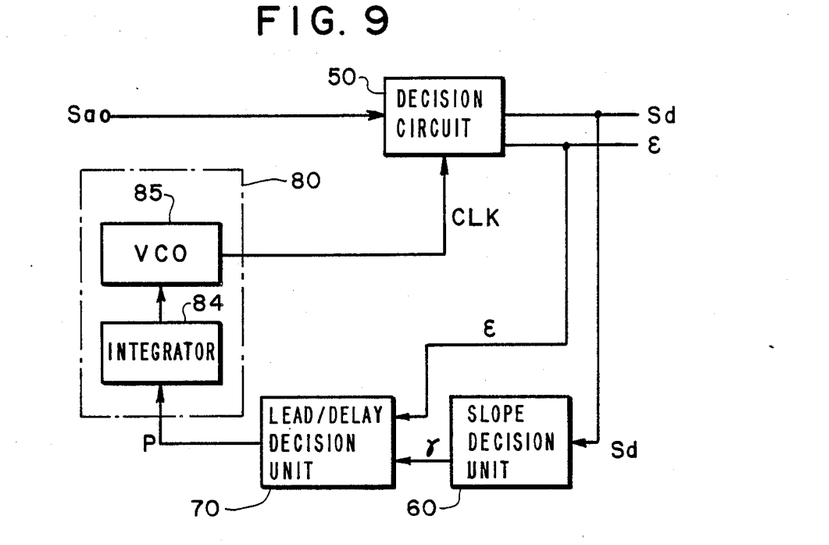
FIG. 9 is a block diagram of a third embodiment of the present invention.

FIG. 9 illustrates the structure of the third embodiment. As the decision circuit 50, the slope decision unit 60 and the lead/delay decision unit 70, the circuits indicated in FIG. 6 may be used.

The integrator 84 and VCO 85 correspond to the clock generating unit 80 indicated in FIG. 6. The integrator 84 integrates the decision signal P sent from the lead/delay decision unit 70. VCO 85 oscillates with the frequency corresponding to an integral value and outputs the decision clock CLK to the decision circuit 50. The integrator 84 operates in common as the integrator 82 of FIG. 6 and the low-pass filter 44 of FIG. 1. Thereby, the full-wave rectifier 41 and phase comparator 43 of FIG. 1 and the phase shifter 83 of FIG. 6 may be omitted.

Figure 10:
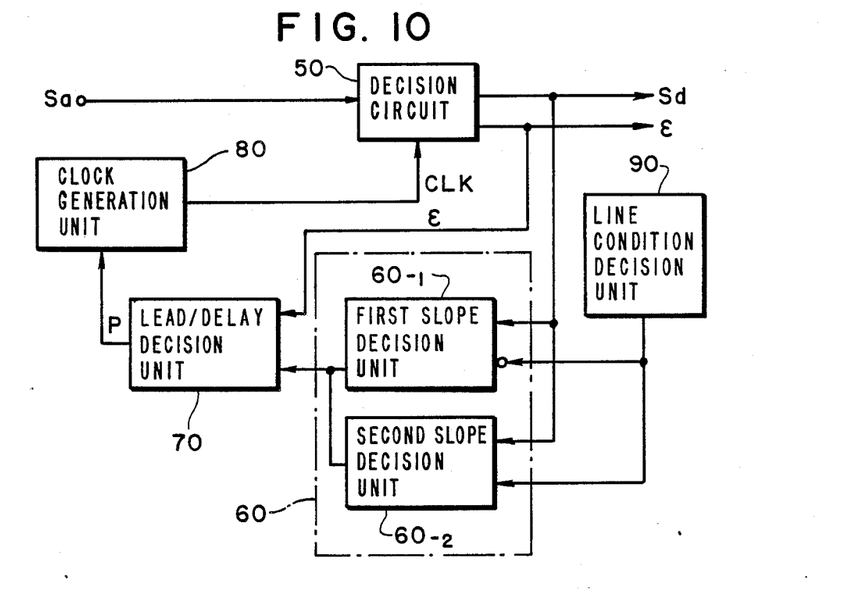
FIG. 10 is a basic block diagram of a fourth embodiment of the present invention.

FIG. 10 is a basic constitution of the fourth embodiment of the present invention. In FIG. 10, a line condition decision means 90 is provided in addition to the constitution indicated in FIG. 3 in this embodiment a first slope decision unit, 60-1 and a second slope decision unit 60-2 are provided as the slope decision unit 60. One of these slope decision unit 60-1, 60-2 is selected by the line condition decision means 90 in accordance with the line conditions. As the decision circuit 50, the lead/delay decision unit 70 and the clock generating unit 80, circuits similar to those of FIG. 6 may be used.

Figure 11:
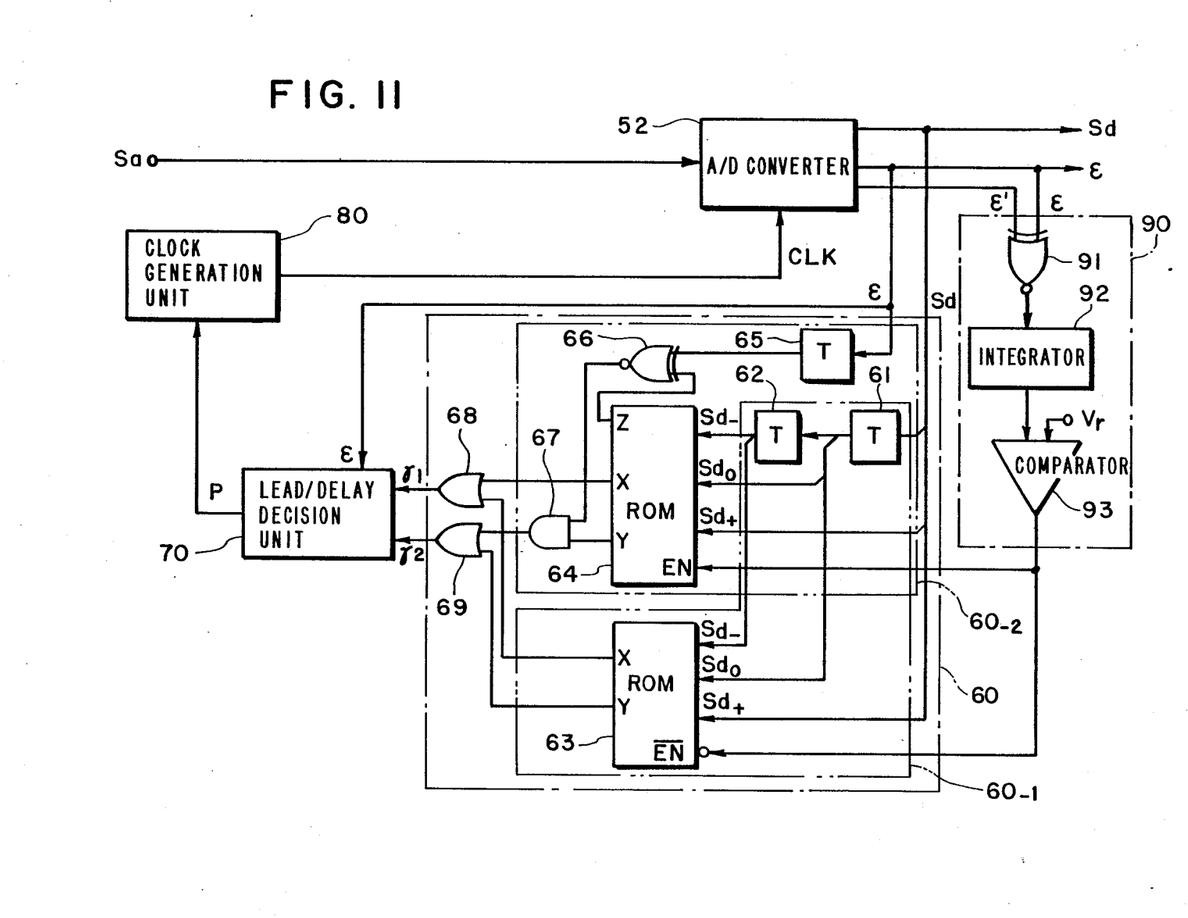
FIG. 11 is a detail block diagram of the fourth embodiment of the present invention.

FIG. 11 indicates detail constitution of the fourth embodiment of the present invention. The internal structure of the slope decision unit 60-1 of FIG. 10 and the slope decision unit 60-2 of FIG. 10 are respectively similar to the slope decision means 60 of FIG. 8. However, ROM 63 and ROM 64 are respectively provided with the enable terminals ($\overline{EN}$,EN) which are driven when "0" and "1" are respectively input to these terminals. Enable terminals also stop the operations of ROM 63 and ROM 64 when "1" and "0" are respectively input to such terminals. Moreover, the delay circuits 61 and 62 are used in common by the first and second slope decision units 60-1, 60-2.

The exclusive NOR circuit 91, integrator 92 and comparator 93 correspond to the line condition decision means 90 of FIG. 10. The A/D converter 52 corresponds to the decision circuit 50 of FIG. 3 and outputs not only the decision data $S_d$ and the decision error signal but also the subdecision error signal $\epsilon'$. The subdecision error signal $\epsilon'$ indicates whether the multi-level signal exists in the upper or lower range when the range sectioned by the decision error signal $\epsilon$ is further divided into two sections, and the signal becomes "1" and "0" for respective ranges. The sub-decision error signal can be obtained as the 5th bit B5 from the decision circuit in the case of a 8-level signal.

When the decision error signal $\epsilon$ is "1" and the sub-decision error signal $\epsilon'$ is "1", the input level to the A/D converter 52 is in the higher range among two ranges having levels higher than the correct decision level. Similarly, when the decision error signal $\epsilon$ is "0" and sub-decision error signal $\epsilon'$ is "0", an error from the correct decision level is large. On the other hand, when the decision error signal and sub-decision error signal $\epsilon'$ are respectively "1" and "0" or "0" and "1", an error from the correct decision level is small.

The exclusive NOR circuit 91 outputs "1" when the decision error signal $\epsilon$ and sub-decision error signal $\epsilon'$ are respectively "0" and "0" or "1" and "1", namely when error from the correct decision level is. It also outputs "0" when the decision error signal $\epsilon'$ signal $\epsilon'$ and sub-decision error are respectively "0" and "1" or "1" and "0", namely when error from the correct decision level is small.

An integrator 92 integrates the output "1" of the exclusive NOR circuit 91 with a predetermined time constant. The comparator 93 compares such integrated value with the reference voltage $V_r$ and outputs "1" when the integrated value is larger than the reference voltage $V_r$ or "0" when the integrated value is smaller than the reference voltage $V_r$. That is, when the error from the correct decision level becomes large, the integrator decides that the line conditions have gone bad and outputs "1".

While the comparator 93 outputs "0", ROM 63 of the first slope decision unit 60-1 is driven to realize the slope decision explained in regard to the first embodiment and outputs the slope polarity signal $\gamma_1$ and the validity signal $\gamma_2$ respectively through the OR circuits 68 and 69. In this case, the probability for input of a waveform which yields a valid slope polarity signal becomes high comparatively.

While the comparator 93 outputs "1", ROM 64 of the second slope decision unit 60-2 is driven to realize the slope decision explained in regard to the second embodiment and outputs the slope polarity signal $\gamma_1$ and validity signal $\gamma_2$ respectively through the OR circuits 68 and 69. In this case, the probability for input of a waveform which yields a valid slope polarity signal is low but reliability of slope decision when it becomes valid is high. In addition, a large effect can be obtained from the slope decision when the line conditions have gone bad.

In each embodiment explained above, the slope decision is carried out on the basis of the decision data of three continuous decision timings but it may also be done on the basis of the decision data of three or more decision timings.

We claim:

1. A decision timing control circuit, in a radio data transmission system having a sending side transmitting a multi-level signal produced by multi-level amplitude modulation of send data using a carrier, and a receiving side obtaining the send data by demodulating the multi-level signal using a decision circuit outputting a decision error signal indicating whether the multi-level signal after demodulation is higher or lower than a correct decision level and generating received send data decided using recovered clock signal timing, said decision timing control circuit comprising:

slope decision means, operatively connected to the decision circuit, for outputting a slope indication signal indicating multi-level signal slope, at a center decision timing in dependence upon the received send data in at least three continuous decision timings and indicating whether slope is positive or negative;

lead/delay decision means, operatively connected to the decision circuit and said slope decision means, for outputting a phase decision signal by deciding whether decision timing at a decision point is leading or delayed from the decision error signal at the center decision timing and the slopes indication signal; and clock generation means, operatively connected to said lead/delay decision means and the decision circuit, for generating a phase-controlling clock signal based on the phase decision signal.

2. A decision timing control circuit according to claim 1, wherein said slope decision means outputs, as the slope indication signal, a slope polarity signal, indicating a positive slope when the received send data of the decision circuit increases monotonously or a negative slope when the received send data decreases monotonously, and a validity signal, indicating validity of the slope polarity signal when the received send data increases or decreases monotonously and invalidity of the slope polarity signal when the received send data does not increase or decrease monotonously.

3. A decision timing control circuit according to claim 1, wherein said slope decision means outputs, as the slope indication signal (i) a validity signal, indicating validity when the received send data at the center decision timing has a maximum/minimum level, the received send data of a preceding decision timing and the received send data of a succeeding decision timing have levels opposed to each other around a center level, and the decision error signal indicates that the received send data at the center decision timing is higher than the maximum level or lower than the minimum level, and indicates invalidity in all other cases and (ii) a slope polarity signal indicating either a positive slope when the received send data at the succeeding decision timing is higher than the received send data at a preceding decision timing or a negative slope when the received send data at the succeeding decision timing is lower than the received send data at the preceding decision timing.

4. A decision timing control circuit according to claim 1, further comprising line condition decision means, operatively connected to said slope decision means, for determining if line conditions are normal and outputting a selection signal to said slope decision means, and wherein said slope decision means comprises a first slope decision means for outputting a slope polarity signal and a validity signal if the line conditions are normal and a second slope decision means for outputting a slope polarity signal and a validity signal if the line conditions are abnormal either being selectively driven in accordance with the selection signal.

5. A decision timing control circuit according to claim 3, wherein said lead/delay decision means decides lead and delay of decision timing by exclusive ORing the decision error signal sent from the decision circuit and the slope polarity signal ($\gamma_1$) sent from said slope decision means, and updates the phase decision signal when the validity signal sent from said slope decision means indicates validity.

6. A decision timing control circuit according to claim 1, wherein said clock generation means comprises:
   a bit timing recovery circuit, operatively connected to receive the multi-level signal from the receiving side of the radio data transmission system, for recovering the phase-controlled clock signal from the multi-level signal;
   an integrator, operatively connected to said lead/delay decision means, for integrating the phase decision signal to produce an integrated value; and
   a phase shifter, operatively connected to said integrator, for shifting the phase of the phasecontrolled clock signal on the basis of the integrated value.

7. A decision timing control circuit according to claim 1, wherein said clock generation means comprises:
   an integrator, operatively connected to said lead/delay decision means, for integrating the phase decision signal to produce an integrated value; and
   an oscillator, operatively connected to said integrator, for outputting the phase-controlled clock signal with a frequency based upon the integrated value.

8. A decision timing control circuit according to claim 3, wherein said slope decision means comprises:
   decision address means for generating a decision address, in dependence upon the received send data at the preceding, succeeding and center decision timings; and
   memory means for storing values accessed by the decision address to produce the slope polarity signal and the validity signal corresponding to the decision address.

9. A decision timing control circuit according to claim 8, wherein said decision address means comprises at least one delay means for delaying the received send data at least one cycle of the phase-controlled clock signal to provide the preceding and center decision timings.

10. A decision timing control circuit according to claim 1, further comprising line condition decision means, operatively connected to said slope decision means and said decision circuit, for determining if line conditions are normal and outputting a selection signal to said slope decision means in dependence upon the line conditions.

11. A decision timing control circuit according to claim 1, wherein said slope decision means comprises first slope decision means for deciding the slope of the multi-level signal when the received send data changes monotonously.

12. A decision timing control circuit according to claim 11, wherein said slope decision means further comprises second slope decision means for deciding the slope of the multi-level signal when the received send data at the center decision timing in the decision circuit has a maximum/minimum level, the received send data of a preceding decision timing and the received send data of a succeeding decision timing have levels opposed to each other around a center level, and the decision error signal indicates that the received send data at the center decision timing is one of higher than the maximum level and lower than the minimum level.

13. A decision timing control circuit according to claim 12, further comprising line condition decision means, operatively connected to said first and second slope decision means and said decision circuit, for selecting said first slope decision means if line conditions are normal and said second slope decision means if the line conditions are abnormal.

14. A decision timing control circuit according to claim 13, wherein said clock generation means comprises:
   an integrator, operatively connected to said lead/delay decision means, for integrating the phase decision signal to produce an integrated value; and
   an oscillator, operatively connected to said integrator, for outputting the phase-controlled clock signal with a frequency based upon the integrated value.

15. A decision timing control circuit according to claim 2, wherein said clock generation means comprises:
   an integrator, operatively connected to said lead/delay decision means, for integrating the phase decision signal to produce an integrated value; and
   an oscillator, operatively connected to said integrator, for outputting the phase-controlled clock signal with a frequency based upon the integrated value.

16. A decision timing control circuit according to claim 2, further comprising line condition decision means, operatively connected to said slope decision means and said decision circuit, for determining if line conditions are normal and outputting a selection signal to said slope decision means in dependence upon the line conditions.

17. A decision timing control circuit according to claim 3, further comprising line condition decision means, operatively connected to said slope decision means and said decision circuit, for determining if line conditions are normal and outputting a selection signal to said slope decision means in dependence upon the line conditions.

18. A decision timing control circuit according to claim 2, wherein said lead/delay decision means comprises:
   an exclusive OR circuit, having a first input terminal for receiving the slope polarity signal, a second input terminal and a first output terminal; and
   latching means, having a data input terminal operatively connected to the first output terminal, a clock input terminal receiving the validity signal and a second output terminal operatively connected to said clock generation means, for updating the phase decision signal in dependence upon the validity signal.

19. A decision timing control circuit according to claim 18, further comprising delay means, having a third input terminal operatively connected to said decision circuit to receive the decision error signal and a third output terminal connected to the second input terminal of said exclusive OR circuit, for delaying the decision error signal at least one clock cycle of the phase-controlled clock signal.

* * * * *

UNITED STATES PATENT AND TRADEMARK OFFICE
CERTIFICATE OF CORRECTION

PATENT NO. : 4,912,726
DATED : March 27, 1990
INVENTOR(S) : Iwamatsu et al.

It is certified that error appears in the above-identified patent and that said Letters Patent is hereby corrected as shown below:

Col. 2, line 50, "and deciding by" should be

--and by deciding--;

Col. 3, line 25, "of a levels of" should be

--of levels of a--;

Col. 3, line 30, "decided" should be --decision--;

Col. 4, line 50, "signal $\gamma$" should be

--signal $\epsilon$--.

Col. 5, line 46, "the waveform in such" should be

--in the waveform such--;

Col. 5, line 56, " "AND" " should be --OR--, and

"OR" should be --AND--;

Col. 6, line 66, "Enable" should be

--The enable--;

Col. 7, line 29, "is. It" should be

--is large. It--.

UNITED STATES PATENT AND TRADEMARK OFFICE
CERTIFICATE OF CORRECTION

PATENT NO. : 4,912,726
DATED : March 27, 1990
INVENTOR(S) : Iwamatsu et al.

It is certified that error appears in the above-identified patent and that said Letters Patent is hereby corrected as shown below:

Col. 7, line 30, "signal $\epsilon'$ signal $\epsilon'$"

should be --signal $\epsilon$--;

Col. 7, line 31, "error are" should be

--error signal $\epsilon'$ are--;

Col. 9, line 25, "phasecontrolled"

should be --phase-controlled--.

Signed and Sealed this

Twenty-eighth Day of May, 1991

Attest:

HARRY F. MANBECK, JR.

*Attesting Officer*  *Commissioner of Patents and Trademarks*